Feb. 24, 1959  A. E. FENTIMAN  2,874,959
TRANSMISSION MECHANISM SELECTABLE OPERABLE BY
EITHER OF TWO POWER SOURCES
Filed Jan. 18, 1956  4 Sheets-Sheet 1

Inventor
ARTHUR E. FENTIMAN
Attorney

Feb. 24, 1959     A. E. FENTIMAN     2,874,959
TRANSMISSION MECHANISM SELECTABLE OPERABLE BY
EITHER OF TWO POWER SOURCES
Filed Jan. 18, 1956     4 Sheets-Sheet 2

Inventor
ARTHUR E. FENTIMAN
Attorney

Inventor
ARTHUR E. FENTIMAN
Attorney

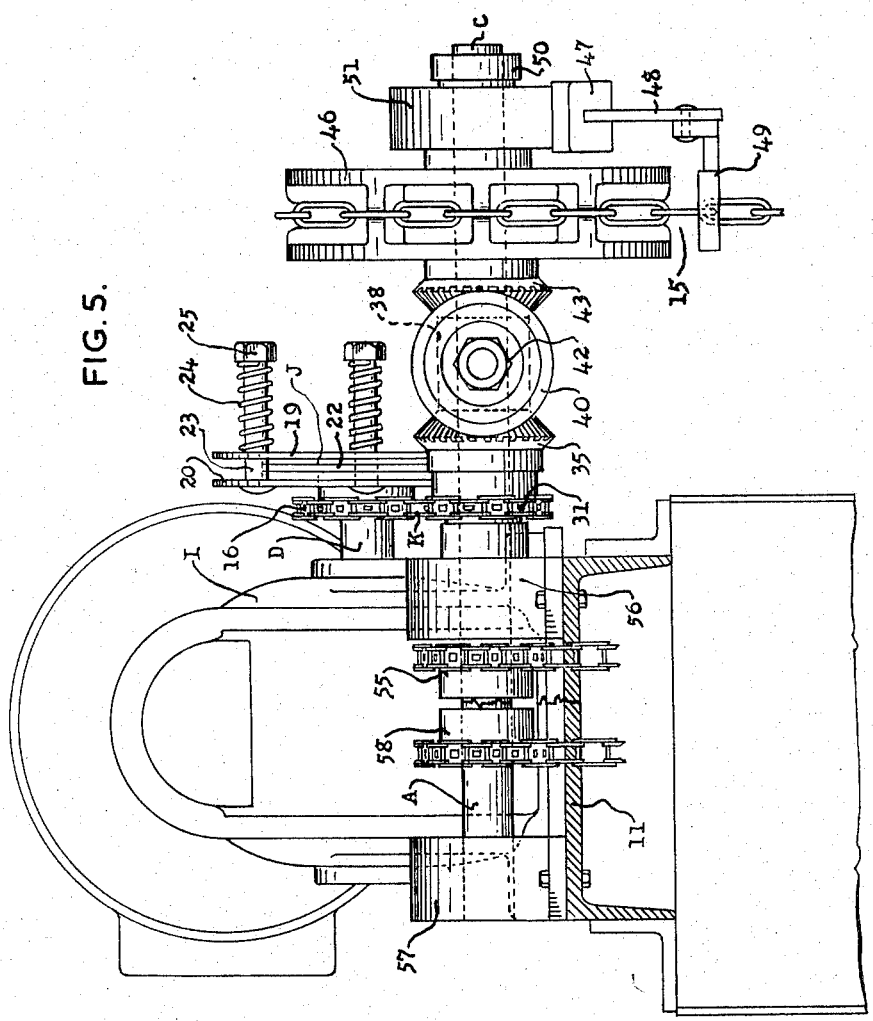

United States Patent Office 2,874,959
Patented Feb. 24, 1959

2,874,959

TRANSMISSION MECHANISM SELECTABLE OPERABLE BY EITHER OF TWO POWER SOURCES

Arthur E. Fentiman, Ottawa, Ontario, Canada, assignor to F. Fentiman & Sons, Ltd., Carleton, Ontario, Canada Application January 18, 1956, Serial No. 559,996

5 Claims. (Cl. 268—59)

This invention relates to improvements in transmission mechanism and appertains particularly to one that may be connected with two power sources and selectably operable by either one.

Usually a transmission device connects a power source or driving means with a unit to be driven thereby. In the present invention the transmission mechanism is designed to be driven by either one of two power sources such as an electric motor and stand-by gasoline engine, or an electric motor and a manually operated power input or some such combination of independent or dissimilar power sources.

The disclosure illustrates the transmission mechanism as applied to the operating mechanism for an overhead door of the type used in industrial buildings, warehouses and the like.

Several kinds of mechanism for such doors have been and are being used, ranging from the wholly manually operated door to the power operated door.

Many of these mechanisms such as pneumatic, hydraulic etc., have the drawback that they require a power plant to be established on the premises in which the doors are used, and this entails the use of floor space in the building at the expense of more pressing needs to which the floor space could be put.

Moreover such power plants are usually expensive, complicated and hard to install and entail heavy maintenance charges, and should there be any interruption in the service, then the operation of the doors would become manual pending the necessary repairs or corrections being made, thus reducing the efficient operation of the mechanism.

Doors of the above types are not restricted to commercial building doors, but are now in general use in garages, factories, hangars, and other buildings, and it is with this broad class of overhead doors that I have found one particularly useful field for the employment of this transmission device.

After an exhaustive study of present day uses of overhead doors I have come to the conclusion that the motive power for operating most of these doors is preferably electrical in combination with manual operation.

Electric power when supplied from an external source eliminates the installing and maintenance of a power plant on the premises in which the doors are used.

Each overhead door may be operated by a reversible electrical motor of conventional construction and of the desired horse power, each door being equipped with its own independent and individual motor. Moreover a small electric motor can readily be mounted on the lintel of a door frame in the best position to operate the door so leaving the floor space free.

After carefully considering all the drawbacks of the present operation of overhead doors, and the advantages I have outlined, I have invented a dual control operating mechanism which can be advantageously employed in a wide variety of uses such as the herein illustrated overhead doors of standard construction.

The principal object of the invention is to provide a transmission mechanism, of the character and for the purposes described for connection with two power sources and operable by either, that is of compact design and improved construction.

A further object of the invention is to provide a transmission mechanism operable in either direction by one or the other of two power sources connected therewith.

A further object of the invention is to provide a transmission mechanism that may be selectably driven by either of two power sources connected therewith and having holding means operating on the unchosen power source.

A further and specific object of the particular embodiment of the invention as applied herein is to provide an overhead door operating mechanism which may be power controlled or, if and when desired, manually operated.

Another object is to render the manual control static when the power control is in operation, and vice versa.

Still another object of my invention is to construct a door operating mechanism which is compact in construction, strong and durable and in which the operating parts are at all times easily accessible and visible for inspection and repair.

A further object is to so construct the door operating mechanism that it will be highly efficient and better able to perform the functions required of it.

Other objects will be made clear as this specification proceeds.

So that the nature of my invention will be clearly understood I have illustrated an embodiment of my invention but I wish it to be understood that I do not limit my invention to the specific construction illustrated and described, but reserve the right to modify the same within the scope of my appended claims.

In the drawings:

Figure 5 is an enlarged end elevation of the electric motor, hand chain and door operating mechanism.

Like characters of reference refer to like parts in the several figures.

Figure 2:
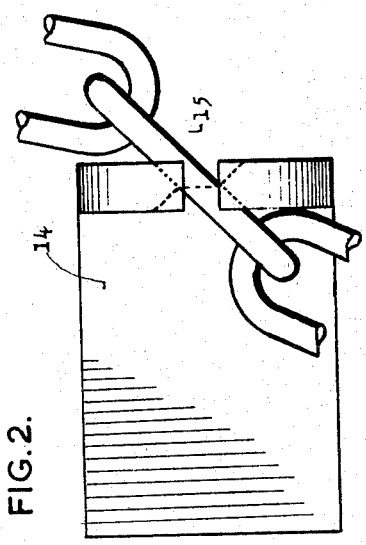
Figures 2 and 2A are an end and side elevations respectively of the hand chain lock which is adapted to be mounted on the cover of the counterweight casing on the door hardware.
Figure 2A:
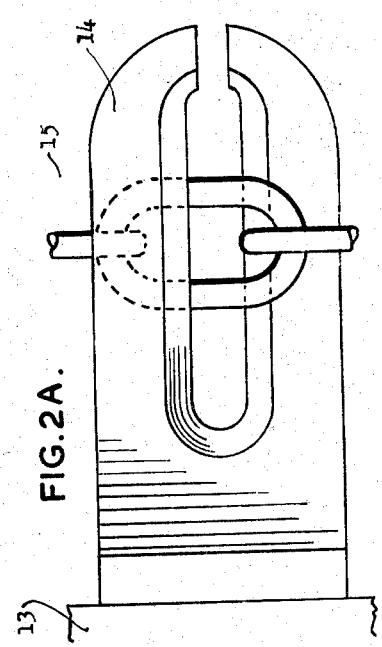

Referring to the drawings, G represents a door and hardware comprising side members or uprights 10 and an upper transverse member or lintel 11. Extending laterally from one of the side members 10 of the door frame is a casing 13 designed to house a counterweight for the door 12, but as this counterweight is of known construction and generally utilized on balanced doors it is not illustrated. On an outer wall of the casing 13 a lock 14 is provided for the endless hand chain 15 by means of which the door operating mechanism H may be manually operated when desired.

This door operating mechanism H includes a reversible prime mover or electric motor I which is mounted on and secured to the lintel 11 of the door hardware G. The reversible electric motor I is of conventional and well known construction but is not (per se) my invention so that it is not deemed necessary to describe it. This motor may be plugged into an electric circuit which derives its power from an external source. The motor I is connected by reduction gears with the drive shaft D journalled in the motor housing and one end of the drive shaft projects beyond the housing and on the shaft D a bushed sprocket wheel 16 is rotatably mounted and is formed on its outer face with a peripheral flange 17.

Figure 4:
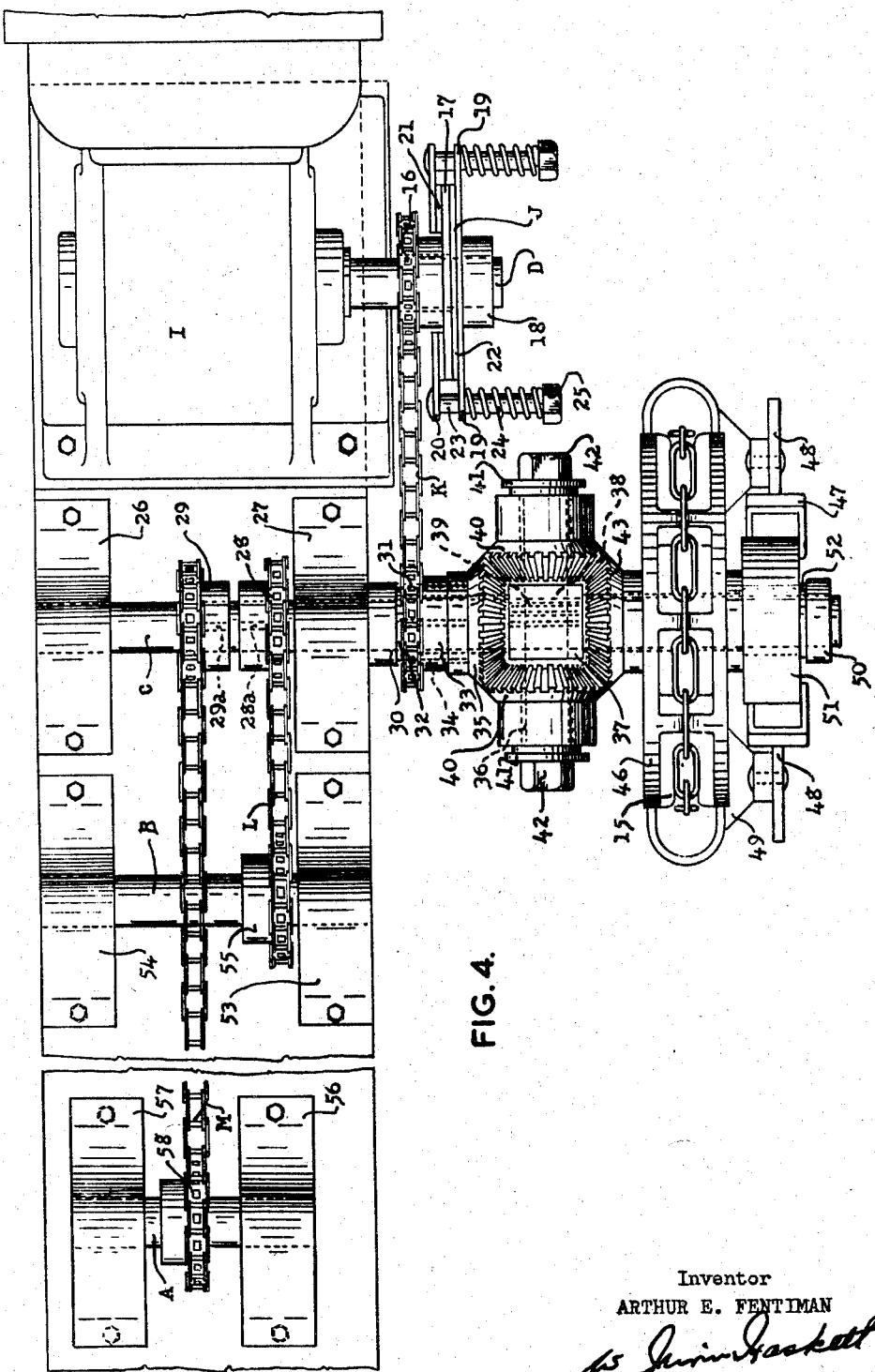
Figure 4 is an enlarged plan view of the door operating mechanism showing the location of the reversible electric motor and the manually operated hand chain.

On the outer end of the shaft D a driving hub 18 is mounted which is provided with a peripheral flange 19 spaced from and in parallelism with the flange 17 on the sprocket wheel 16. Encircling the sprocket hub 16 is a driving clutch ring 20 which is spaced from the flange 17, and by reference to Figure 4 it will be clear that the driving clutch ring 20, flange 17 and flange 19 are equidistantly spaced apart in that order.

Between the driving clutch ring 20 and the flange 17 an asbestos ring 21 is located and between the flange 17 and the flange 19 an asbestos ring 22 is located. These asbestos rings 21 and 22 and the ring 20 and flanges 17 and 19 constitute a clutch J by means of which rotary motion of the shaft D is transmitted to the sprocket wheel 16.

The several members of the clutch J are held in spring pressed engagement by a plurality of bolts 23 which pass through the driving clutch ring 20 and flange 19 and on the stem of each bolt a compression spring 24 is mounted and these springs are located between the flange 19 and the adjustable nuts 25 so that on adjustment of the nuts the desired pressure may be exerted on the flange 19 and driving clutch ring 20 to compress the asbestos rings 21 and 22 between the ring 20 and flange 17 and also between the flange 19 and the flange 17.

The adjustment of the clutch J is such that the power transmitted from the driving hub 18 on the shaft D to the sprocket wheel 16 is without jar. This is important as the load on the electric motor is taken up easily and uniformly.

Adjacent to the shaft D and parallel therewith is a driven shaft C which is rotatably mounted in spaced pillow blocks 26 and 27 which are in turn secured to the lintel 11 of the door frame G by suitable means.

On the shaft C a pair of spaced sprocket wheels 28 and 29 are secured by keys 28a and 29a and the sprocket wheels are located between the pillow blocks 26 and 27.

One end of the shaft C projects beyond the pillow block 27 and a collar 30 carried by the shaft engages the outer face of the pillow block 29, and a sprocket wheel 31 is mounted on the shaft and between the sprocket wheel and the collar 30 a washer 32 is located. The sprocket wheel 31 is connected by a chain drive K with the sprocket wheel 16 on the shaft D of the electric motor I.

The sprocket wheel 31 and the bushing 33 are connected by a plurality of pins 34 with a mitre gear 35 and the sprocket wheel, bushing and mitre gear are rotatable on the shaft C as a unit.

A differential axle 36 is provided intermediate of its length with an enlarged portion 37 through which the orifice 38 extends and this orifice embraces the shaft C and the enlarged portion 37 is keyed to the shaft C at 39. The axis of the differential axle intersects and is at right angles to the longitudinal axis of the shaft C.

Rotatably mounted on the opposite ends of the differential axle 36 are a pair of mitre gears 40 which mesh with the mitre gear 35 and a thrust washer 41 is provided between the mitre gears 40 and the castellated nuts 42 which are threaded to the ends of the differential axle 36.

Figure 1:
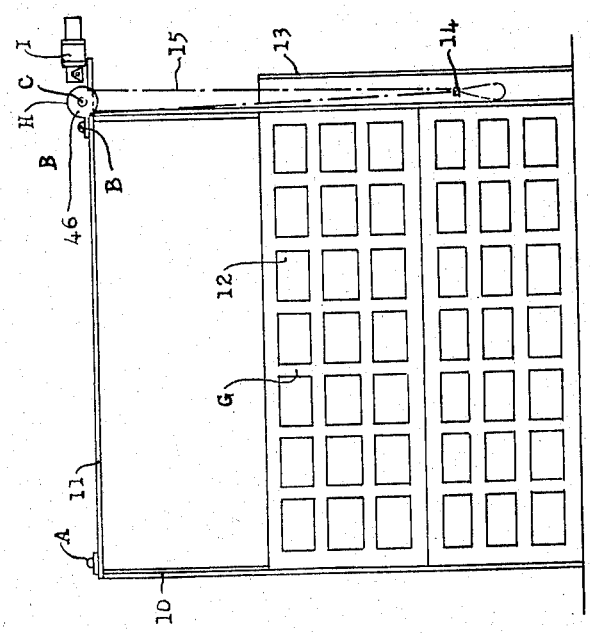
Figure 1 is a front elevation of a vertical overhead door showing my power and manually controlled mechanism for operating the door mounted on the lintel of the door hardware.
Figure 3:
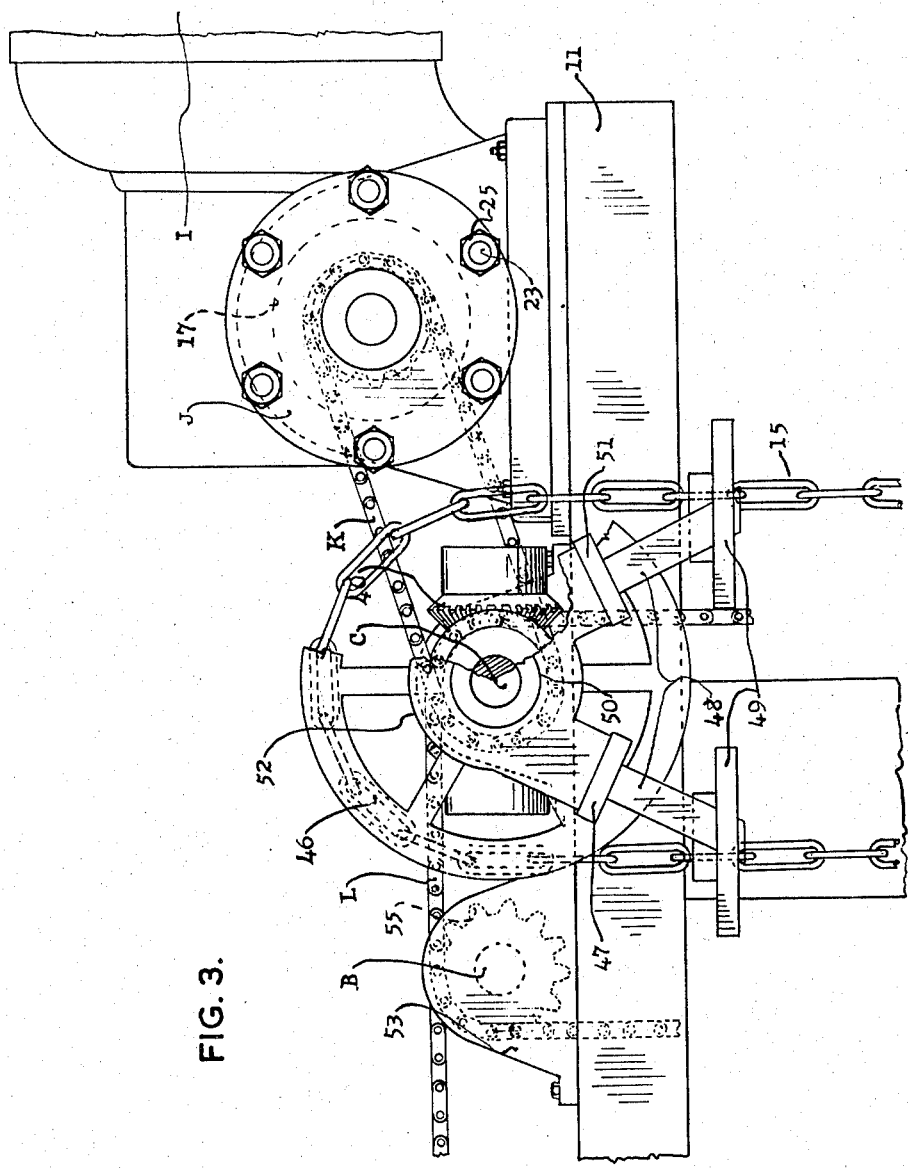
Figure 3 is an enlarged front elevation of a reversible electric motor and hand chain by which the elevating and lowering mechanism of the door is operated.

A fourth mitre gear 43 is rotatably mounted on the shaft C and meshes with the mitre gears 40, and the mitre gear 43 is attached to the sprocket pulley 46 which is rotatably mounted on the shaft C and with this sprocket pulley the hand chain 15 engages as shown in Figure 1. The several mitre gears are suitably bushed.

On the end of the shaft C a guide 47 for the endless hand chain 15 is mounted and this consists of a casting 51 from which two diverging downwardly disposed radial arms 48 extend and these arms carry guides 49 through which the hand chain 15 passes. On the end of the shaft C a collar 50 is secured and between this collar and the casting 51 a thrust washer 52 is located.

On the lintel 11 of the door hardware G a shaft B is supported in the pillow blocks 53 and 54 secured to the lintel 11 by suitable means and on this shaft a sprocket wheel 55 is rotatably mounted and is designed to be connected to the sprocket wheel 28 on the shaft C by a chain L one end of which is attached to the door 12, and the other end to the aforementioned counterweight, this chain forming a flexible means by which the door 12 is elevated as will be explained hereafter.

A fourth shaft A is mounted in pillow blocks 56 and 57 which are suitably secured to the lintel 11 of the door hardware G and this shaft carries a sprocket wheel 58 which is connected by a chain M with the sprocket wheel 29 on the shaft C. One end of the chain M is attached to the door 12 to act as a flexible lifting means and the other end of the chain M is attached to the aforementioned counterweight.

The operation of my dual overhead door control is as follows: When the power unit namely the electric motor I is to be used, then the clutch is adjusted and the hand chain 15 secured to the lock 14 so holding the sprocket pulley 46 and mitre gear 43 static.

The switch for the reversible motor I is closed and rotary motion is transmitted to the shaft D and through the drive hub 18 to the clutch J and thence to the sprocket wheel 16. The chain drive K connecting the sprocket wheels 16 and 31 then rotates the mitre gear 35 which is connected by the pins 34 to the sprocket wheel 31.

The mitre gear 35 meshing with the mitre gears 40 on the differential axle 36 rotates the mitre gears 40 and since the mitre gear 43 is stationary, being held against rotation by the locked hand chain 15, then the mitre gears 40 walk around the mitre gear 43 and through the medium of the differential axle 36 rotate the driven shaft C.

The sprocket wheels 28 and 29 rotate with the shaft C and as these sprockets are connected by chains L and M with the sprockets 55 and 58 on the shafts B and A respectively, then they exert a pull on these chains.

As stated above the chains L and M are attached at one end to the door 12 and at the other end to the aforementioned counterweight so that a lifting pull is transmitted to the door to elevate and open it.

When closing the door 12 the electric motor I is reversed. The same sequence of operations occur, but since the electric motor I is driving in the reverse direction the shaft C is rotated in a reverse direction to that explained above thereby causing the door 12 to close.

When the door control mechanism is to be manually operated, the switch of the electric motor I is turned off and the motor becomes motionless. The sprocket wheel 16 on the shaft D which is driven by the electric motor I also becomes static and as this sprocket wheel is connected by the chain drive K with the sprocket wheel 31 then this sprocket wheel is also held stationary against rotation subject to the limitations of the adjustable slipping clutch J.

The mitre gear 35 which is attached to the sprocket wheel 31 by the pin 34 is likewise held stationary against rotation subject to the limitations of the adjustable slipping clutch J.

The hand chain 15 is now disengaged from the lock 14 and manual power is applied to the chain to rotate the sprocket pulley 46 and transmit rotary motion to the mitre gear 43 which meshing with the mitre gears 40 rotate them on the differential axle 36. Since the mitre gear 35 is stationary the mitre gears 40 walk around the gear 35 and through the medium of the differential axle 36 transmits rotary motion to the shaft C. This rotary motion of the shaft C rotates the sprocket wheels 28 and 29 keyed thereon and the sprocket wheel 28 being connected by the flexible chain L to the sprocket wheel 55 on the shaft B exercises a lifting pull on the door 12.

In the meantime the sprocket wheel 29 which is connected to the sprocket wheel 58 on the shaft A by the flexible chain M exerts a pull on the door 12 and these two chains elevate the door.

When it is desired to close the door 12 then manual power is applied to the chain 15 to rotate the pocket pulley 46 in a reverse direction to that described above and this rotary motion is transmitted through the mitre gear 43 to the mitre gears 40 which walk around the stationary mitre gear 35 and through the medium of the differential axle 36 rotate the shaft C in a reverse direction to that described above.

The sprocket wheels 28 and 55 and the flexible chain 11 and the sprocket wheels 29 and 58 and the flexible chain M then permit the door 12 to be lowered.

From the foregoing description taken in connection with the accompanying drawings, it will be manifest that a dual control transmission mechanism is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what is claimed as new is:

1. Transmission mechanism for operation by either of two power sources comprising a drive shaft for actuation by one power source, a unitary driven shaft, a differential gear mechanism carried wholly by said driven shaft, means connecting said drive shaft and said differential gear mechanism to transmit rotary motion to the driven shaft, means on said driven shaft for actuation by a second power source and cooperating with said differential gear mechanism, and operating means actuated by said driven shaft.

2. An overhead door operating mechanism comprising a drive shaft, a unitary driven shaft, a differential axle formed with an enlargement intermediate of its length and having an orifice through which the driven shaft passes, said enlargement being rigidly connected to the driven shaft and axle, mitre gears rotatably mounted on the ends of the differential axle, mitre gears rotatably mounted on the driven shaft and meshing with the mitre gears on the axle, means for transmitting rotary motion from the drive shaft to one of the mitre gears on the driven shaft, means for holding the other mitre gear on the driven shaft against rotation, flexible door operating means and means on the driven shaft to actuate the flexible door operating means.

3. The overhead door operating mechanism claimed in claim 2 in which the means for holding the said other mitre gear on the driven shaft against rotation consists of a pocket pulley connected to said other mitre gear, a chain engaging the pocket pulley and a lock for the chain.

4. A transmission mechanism comprising a drive shaft, a driving hub on the drive shaft, a sprocket wheel on the drive shaft, a clutch operatively connecting the driving hub and sprocket wheel, a unitary driven shaft, a differential gear mechanism wholly mounted on the driven shaft and including a sprocket wheel, a chain drive connecting the sprocket wheels and a flexible operating means actuated by the driven shaft, said clutch consisting of a flange carried by the sprocket wheel in the drive shaft, a flange carried by the driving hub, a ring adjacent the first said flange, a compressible friction ring between the said ring and adjacent flange, a compressible friction ring between the two flanges and resiliently controlled means spaced around and located adjacent the periphery of the clutch to hold the above named clutch mechanism in assembled and adjustable position.

5. A transmission mechanism comprising a drive shaft, a driving hub on the drive shaft, a sprocket wheel on the drive shaft, a clutch operatively connecting the driving hub and sprocket wheel, a unitary driven shaft, a differential gear mechanism wholly mounted on the driven shaft and including a sprocket wheel, a chain drive connecting the sprocket wheels and a flexible operating means actuated by the driven shaft, said clutch consisting of a flange carried by the sprocket wheel on the drive shaft, a flange carried by the driving hub, a ring adjacent the first said flange, a compressible friction ring between the said ring and adjacent flange, a compressible friction ring between the two flanges and resiliently controlled means spaced around and located adjacent the periphery of the clutch to hold the above named clutch mechanism in assembled and adjustable position; the means for holding the clutch members assembled consisting of bolts passing through the ring and adjacent the periphery of the flange on the driving hub and springs on each bolt stem between the flange and the nuts on the bolts.

References Cited in the file of this patent

UNITED STATES PATENTS

| 1,962,475 | Blodgett | June 12, 1934 |
| 2,110,231 | McCloud | Mar. 8, 1938 |
| 2,568,808 | Johanson | Sept. 25, 1951 |

FOREIGN PATENTS

| 71,178 | Austria | Feb. 10, 1916 |
| 732,723 | Germany | Mar. 10, 1943 |